(12) United States Patent
Gozdowiak

(10) Patent No.: US 10,102,617 B2
(45) Date of Patent: Oct. 16, 2018

(54) METHOD AND SYSTEM FOR AUTOMATED METER READING

(71) Applicant: Gregory J. Gozdowiak, Germantown, WI (US)

(72) Inventor: Gregory J. Gozdowiak, Germantown, WI (US)

(*) Notice: Subject to any disclaimer, the term of this patent is extended or adjusted under 35 U.S.C. 154(b) by 153 days.

(21) Appl. No.: 15/191,671

(22) Filed: Jun. 24, 2016

(65) Prior Publication Data
US 2016/0379359 A1    Dec. 29, 2016

Related U.S. Application Data

(60) Provisional application No. 62/184,522, filed on Jun. 25, 2015.

(51) Int. Cl.
| | |
|---|---|
| *H04N 7/18* | (2006.01) |
| *G06T 7/00* | (2017.01) |
| *B03B 9/06* | (2006.01) |
| *B09B 3/00* | (2006.01) |
| *B09B 5/00* | (2006.01) |
| *G01D 4/00* | (2006.01) |

(52) U.S. Cl.
CPC ............ *G06T 7/0006* (2013.01); *B03B 9/061* (2013.01); *B09B 3/00* (2013.01); *B09B 5/00* (2013.01); *G01D 4/004* (2013.01); *G06T 2207/30164* (2013.01); *Y02B 90/242* (2013.01); *Y04S 20/322* (2013.01)

(58) Field of Classification Search
CPC ......... G06T 7/0006; G06T 2207/30164; B03B 9/061; B09B 3/00; B09B 5/00; G01D 4/004; Y02B 90/242; Y04S 20/322

USPC ......................................................... 348/126
See application file for complete search history.

(56) References Cited

U.S. PATENT DOCUMENTS

| | | | |
|---|---|---|---|
| 8,144,027 B2 | 3/2012 | Goldberg et al. | |
| 8,786,706 B2 | 7/2014 | Kennedy et al. | |
| 2004/0165738 A1* | 8/2004 | Tsumori | H04R 9/025 381/162 |
| 2012/0194683 A1* | 8/2012 | Goldberg | G01D 4/002 348/160 |
| 2013/0050498 A1 | 2/2013 | Kennedy et al. | |
| 2014/0093172 A1* | 4/2014 | Tonogai | G06K 9/723 382/182 |
| 2014/0286580 A1 | 9/2014 | Kennedy et al. | |
| 2014/0365002 A1* | 12/2014 | Nichols | B65G 47/48 700/240 |

(Continued)

*Primary Examiner* — Michael Lee
(74) *Attorney, Agent, or Firm* — Andrus Intellectual Property Law, LLP

(57) ABSTRACT

A method and system for recycling utility meters that include a plurality of meter dials. At the end of life, utility meters are received at a processing facility and the meter cover is removed and recycled. The meter body is placed on a meter conveyor. While on the conveyor, a digital image is taken of the meter face which includes the plurality of meter dials. A control unit receives the digital image and automatically determines a final meter reading for the meter and determines the meter serial number. An operator is presented with the digital image and can modify either the serial number or the final meter reading. Once confirmed, the digital image, serial number and final meter reading are stored in a historical database and the meter body is recycled.

16 Claims, 6 Drawing Sheets

(56) References Cited

U.S. PATENT DOCUMENTS

2015/0090643 A1\* 4/2015 Struijk .................. B65G 47/26
                                                      209/577
2016/0092745 A1\* 3/2016 Wada ................... G06K 9/3283
                                                      382/177

\* cited by examiner

METHOD AND SYSTEM FOR AUTOMATED METER READING

CROSS REFERENCE TO RELATED APPLICATION

The present application is based on and claims priority to U.S. Provisional Patent Application Ser. No. 62/184,522, the disclosure of which is incorporated herein by reference.

BACKGROUND

The present disclosure generally relates to a multiple dial meter reading system and method and particularly to such system and method that eliminates the need for trained individuals to read multiple rotary dials such as used in gas and electric meters, water meters and the like.

In the retail marketing and distribution of natural gas, electricity and like products, meters are connected at the entrance to the operators system. The meters which have been used for many years include a plurality of rotary dial units for recording of the accumulated usage. Each dial provides a digit reading for a significant place in the meter readout. Conventionally, a rotating needle indicator rotates 360° for each full flow unit of usage, and thus moves from digit 0 through digit 9. A coupling mechanism between the several rotating indicators is such that each complete revolution of a given lesser significant number position dial corresponds to the next most significant digit dial moving by a factor of one in a clockwise and/or counter clockwise movement digit. The dial movement is in a clockwise and/or counter clockwise movement. A proportionate positioning of the indicator needle for each partial rotation of the preceding indicator needle is of course also established. Such readouts are conventionally and almost universally manually read by meter readers. Although any given error in one reading may well be corrected by a subsequent reading, errors are significant and troublesome. In particular, a customer may receive an unusually large billing for a given period because of an error in the meter reading. The customer normally complains, even though the customer may realize that correction will be made at a subsequent date.

Although extensive training programs have been provided, errors in meter reading are a common occurrence, particularly with more inexperienced readers. However, even the experienced reader may periodically include erroneous readings.

The greatest difficulty arises when a dial is at an approximate change-over position between numbers, and particularly from 9 to 0. Although the reader should be able to readily convert to the appropriate digit by reference to the associated preceding dial, errors frequently arise in the reading. The level of error of course indicates the necessity for automation of the meter reading process.

Even with present training methods, it has been found that it is extremely difficult for personnel to totally grasp and become highly proficient in the meter reading. Further, even with personnel having the ability to reasonably follow and understand the procedures, proficiency is only obtained after a very significant time consuming and costly training program.

Presently, many utility companies are replacing analog gas and electric meters with digital metering systems that are able to relay meter readings to the utility either directly or through a mobile meter reading system. The widespread installation of digital meters requires the disposal of the dial-based analog meters that are in the field. When an analog meter is replaced, a final reading of the meter must be made before the meter can be recycled. Currently, this final meter reading is made manually at a recycling facility where the analog meters are disassembled and ultimately recycled for the metal, plastic and glass components. Since a very large number of analog meters are currently being replaced and the manual meter reading process is labor intensive, there is a shortage in trained personnel available at recycling facilities to make the end of life measurements.

There is therefore a significant demand for a system and method to reduce human involvement in the actual reading of the several interrelated dials of analog meters. The system should provide a more rapid and more efficient method in making meter readings and also advantageously be used for storing historic end-of-life readings for later electronic access.

SUMMARY

The present disclosure generally relates to an automated method for recycling facilities to generate a final meter reading from a meter having a plurality of manual dials. More specifically, the present disclosure relates to a method and system that automatically records both the final meter reading and serial number and stores the final meter reading and serial number, along with a digital image of the meter face in a historical database.

In accordance with the present disclosure, the method initially receives a plurality of utility meters that have been removed from service and are ready for disposal and recycling. The meter cover of each of the individual meters is removed to provide a clear view of the meter face, which includes a plurality of meter dials. Each of the plurality of utility meters is moved individually beneath a digital imaging device, such as a digital camera. The digital imaging device obtains a digital image of the meter face and transfers the digital image to a control unit.

The control unit is configured to receive the digital image from the digital imaging device and process the digital image to obtain the serial number of the meter and a final meter reading. The final meter reading is a digital representation of the analog information presented by the series of meter dials.

Operating programs on the control unit are able to convert the meter dial positions present in the digital image into the final meter reading, which is presented to the user on a display. In addition, operating programs present in the control unit are able to either read a barcode representation of the serial number or use optical character recognition (OCR) to determine the serial number from the meter face. Additional software programs operating on the control unit determine whether the meter dial positions in the digital image are consistent with normal positions or whether the meter dials are out of normal tolerances. The meter dials can be out of normal tolerances based upon meter wear, meter tampering, incorrect positioning of the meter body beneath the digital imaging device or other errors that may occur during either processing or at the end of the meter life. If the control unit determines errors are present, the control unit presents an indicator to the operator, which signals the operator to manually review the digital image and possibly adjust the final meter reading or the serial number.

Once the final meter reading and serial number are determined to be accurate, the method of the present disclosure stores the digital image, the serial number and the final meter reading in a historical database. After this information is stored, the meter body can be recycled.

In accordance with one embodiment of the present disclosure, each of the plurality of utility meters is positioned on a meter conveyor and the meter conveyor is operated to move the plurality of utility meters beneath the digital imaging device. If either the final meter reading or the serial number is not accurate, as determined by the control unit, the control unit can prevent additional movement of the meter bodies beneath the digital imaging device until the readings have been corrected by the operator.

A system of the present disclosure is provided to recycle a plurality of utility meters at the end of life of each of the utility meters. The system includes a control unit that moves the meter bodies through the system. A meter conveyor receives each of the utility meters and is operable to move the utility meters from a first end to a second end. A digital imaging device is positioned above the meter conveyor between the first and second ends of the meter conveyor and operates to obtain a digital image of the meter face of each utility meter. The control unit receives the digital image and determines the serial number and final meter reading for each of the utility meters. The control unit then determines whether the serial number and final meter reading are complete. If the final readings are not complete, the control unit signals the operator to manually adjust the automated readings.

Once the serial number and final meter reading are accurate, the control unit stores the digital image, the serial number and the final meter readings in a memory location.

Various other features, objects and advantages of the invention will be made apparent from the following description taken together with the drawings.

BRIEF DESCRIPTION OF THE DRAWINGS

The drawings illustrate the best mode presently contemplated of carrying out the disclosure. In the drawings.

DETAILED DESCRIPTION

Figure 1:
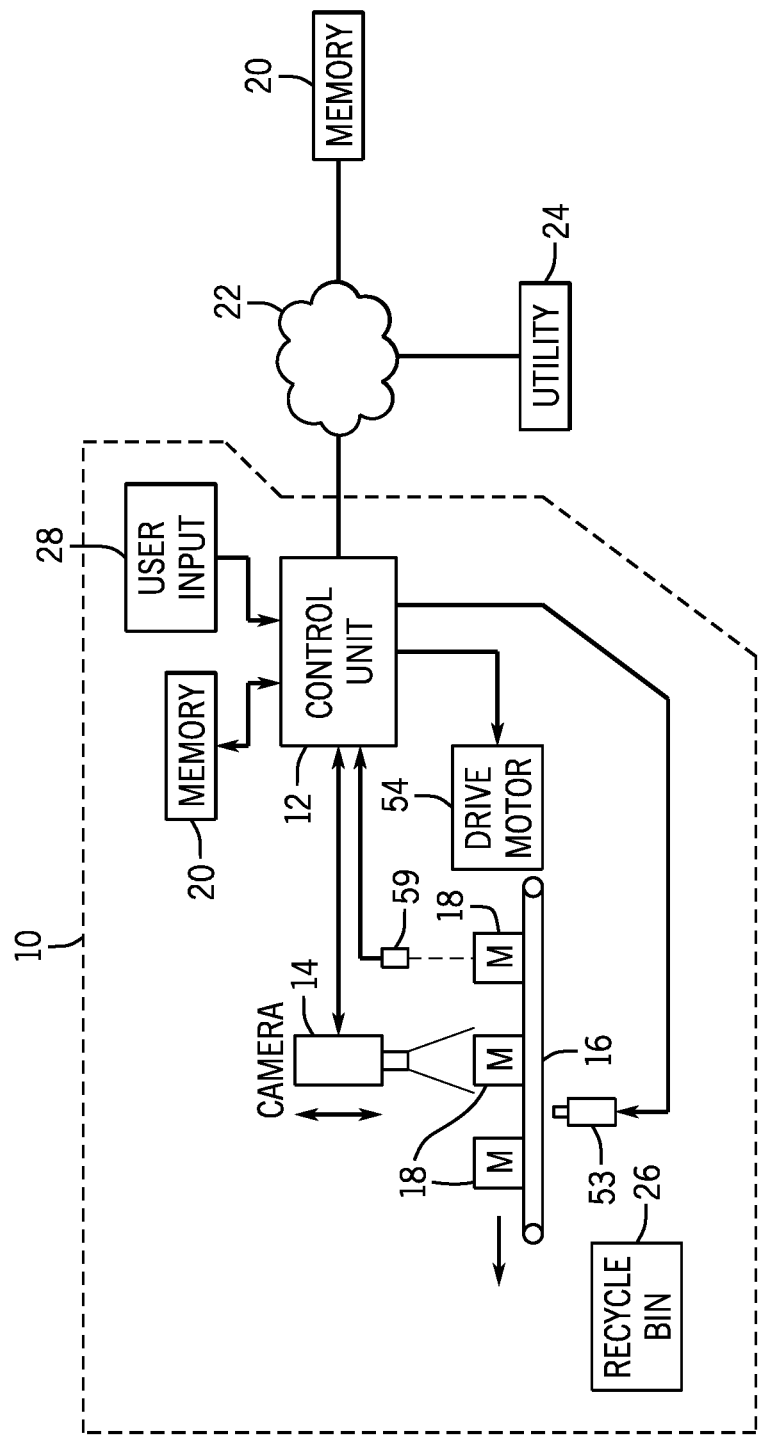
FIG. 1 is a schematic illustration of the system of the present disclosure.

As described previously, the present disclosure relates to a method and system for recycling meters at the end of their service life. FIG. 1 schematically illustrates the method and system of the present disclosure. In the embodiment shown in FIG. 1, a recycling facility 10 receives a supply of analog meters that are being removed from the field. These meters could be electricity meters, gas meters, water meter or any other type of meter that measures commodity consumption.

The recycling facility 10 receives the plurality of meters and separates the recyclable components for recycling. The recyclable components can include the metal meter body and operating component, the glass meter cover or the plastic meter cover. In addition, the recycling facility 10 records a final end of life meter reading and the serial number for each of the meters being recycled.

In the embodiment shown in FIG. 1, the system and method of the present disclosure includes a control unit 12 that is present at the recycling facility 10. The control unit 12 controls operation of an imaging device 14 and controls the operation of a meter conveyor 16 that is positioned to move each of the individual meters 18 beneath the imaging device 14. The control unit 12 includes or is connected to a memory device 20 that includes a historical database that catalogs and stores the information obtained from each of the plurality of meters 18. Although the memory device is shown in the embodiment of FIG. 1 as being separate from the control unit, it should be understood that the memory device 20 could be incorporated directly into the control unit 12. Further, although the memory device 20 is shown located within the recycling facility 10, the memory device 20 could also be accessible through a wireless network 22.

The control unit 12 is shown communicating through the wireless network 22 to a utility 24. However, the control unit 12 could communicate to any other location or interested party through the wireless network 22. In the embodiment shown, the wireless network 22 is contemplated as being the internet such that the control unit 12 could communicate to any internet-enabled device as desired.

Once each of the individual meters 18 are processed utilizing the system and method of the present disclosure, the meters 18 are deposited in a recycling bin 26 for transportation to another facility. Since each of the meters 18 include a relatively significant amount of metal material, the recycling process shown in FIG. 1 allows each of the individual meters 18 to be processed, recycled and disposed of in an efficient manner.

In the embodiment shown in FIG. 1, the control unit 12 is also in communication with an operator input device 28. The operator input device 28 can be a keyboard, touchscreen, computer terminal or any other type of device that allows an operator to communicate commands to the control unit 12 while also receiving information from the control unit 12. In the embodiment illustrated, the operator input device 28 is contemplated as being a touchscreen that includes a visual display that presents information to an operator located within the recycling facility 10.

Figure 2:
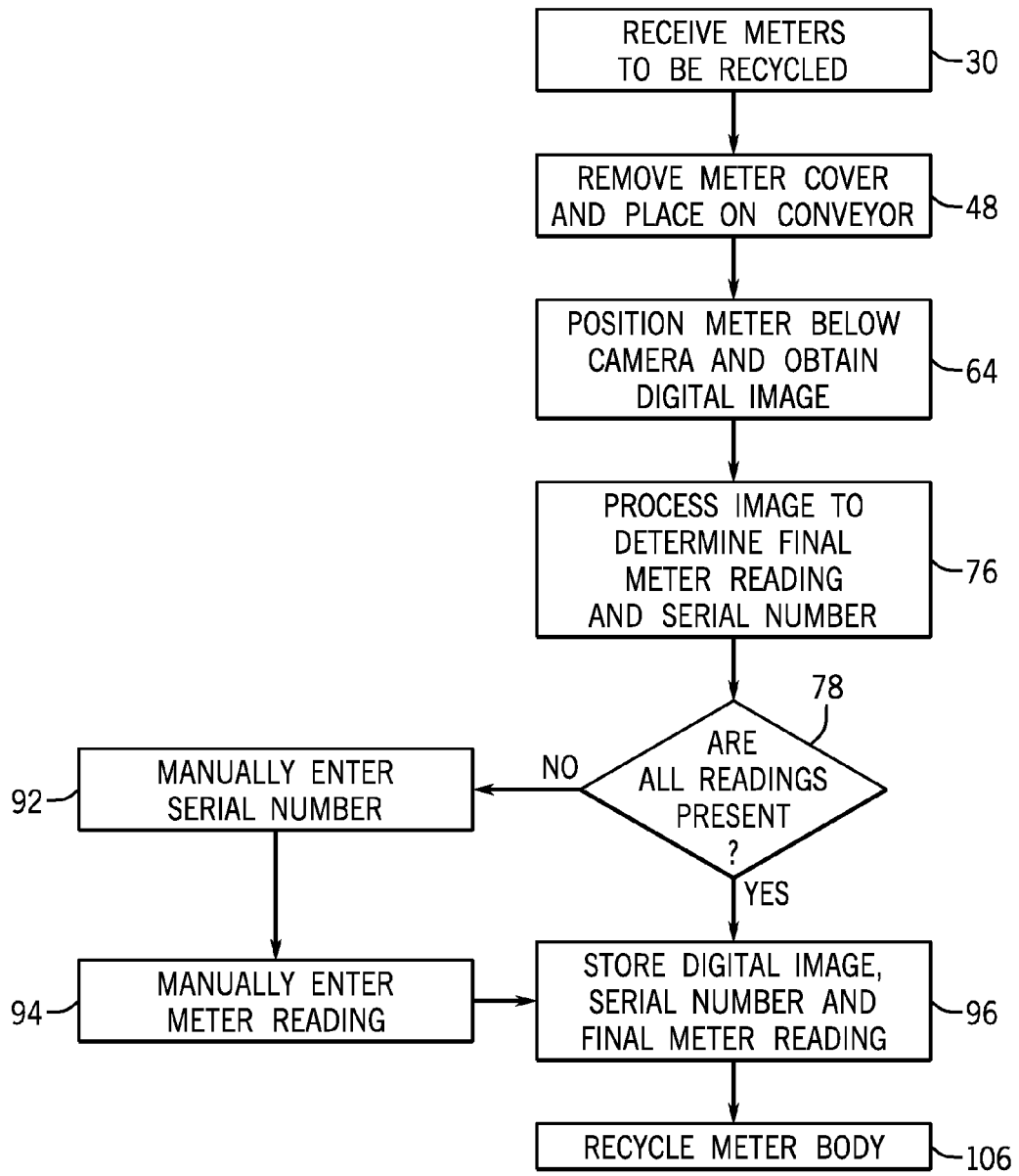
FIG. 2 is a flowchart illustrating the operation sequence carried out by the system of the present disclosure.

FIG. 2 is a flowchart illustrating the operation sequence in accordance with the present disclosure. The flowchart of FIG. 2 will be described in combination with the remaining Figures.

As shown in FIG. 2, meters that are to be recycled are initially received at a facility, as shown by step 30. The meters to be recycled are typically received from either a utility or from a third party contractor that has been hired to remove existing analog utility meters from homes and businesses and replace the old utility meters with updated utility meters, which typically include some type of communication device. Since each of the analog meters removed from a home or facility includes metallic, plastic and glass material that can be recycled, the recycling facility will receive the removed utility meters and separate the different types of material included in the meters for recycling.

Figure 3:
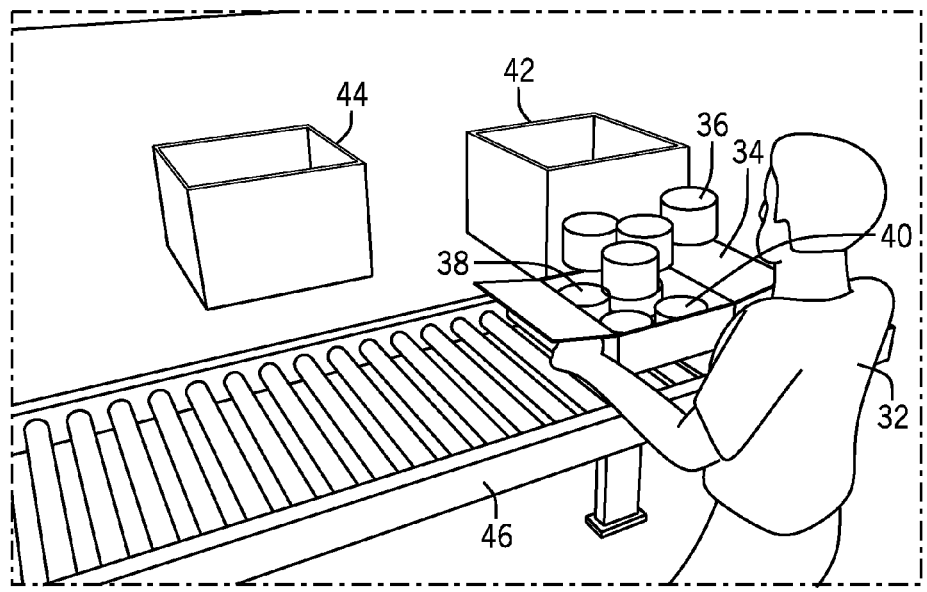
FIG. 3 is an illustration of the receipt of utility meters for recycling.

As can be seen in FIG. 3, an operator 32 receives a box or carton 34 containing a plurality of individual utility meters 18 that need to be recycled. Each of the utility meters 18 includes a meter cover 36 and a meter body 38. The meter cover 36 protects the meter face 40 and associated meter dials contained on the meter face. The meter cover 36 is typically formed from either glass or plastic material. The system and method of the present disclosure removes the meter cover 36 as one of the first processing steps since the normally transparent meter cover is often broken, cracked or foggy, which makes viewing the individual meter dials more difficult.

Once the meter cover 36 is removed, the operator 32 places the meter cover 36 in either a glass recycling bin 42 or a plastic recycling bin 44. The glass and plastic recycling bins 42, 44, once filled, are taken from the recycling facility. As shown in FIG. 3, the box 34 of meters is initially received on a roller conveyor 46 or a support cart.

Figure 4:
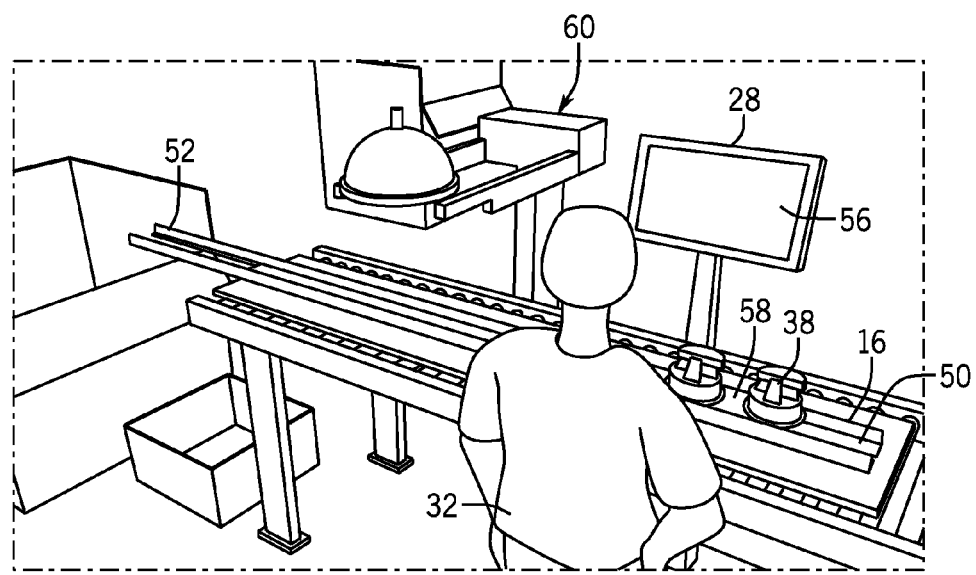
FIG. 4 is an illustration showing the movement of the meter bodies through the system.

Referring back to FIG. 2, once the meter covers have been removed, only the meter bodies 38 remain within each of the individual boxes 34. In step 48, each of the individual meters are removed from the boxes and placed on a meter conveyor 16, as shown in FIG. 4. The meter conveyor 16 includes a conveyor belt or slide device that moves each of the meter bodies 38 from a first end 50 to a second end 52. In one embodiment of the disclosure, the meter conveyor 16 is a manually operated conveyor that allows the operator to push the meters from the first end 50 to the second end 52. As illustrated in FIG. 1, a solenoid stopper 53 is selectively operable to prevent the movement of the meter conveyor 16, as will be described below. It is contemplated that the manually operated conveyor could be replaced with a conveyor that includes a drive motor 54 that operates to move the conveyor belt between the first and second end of the meter conveyor 16.

Referring back to FIG. 4, the operator input device 28 is positioned near the meter conveyor 16 to both present information on a display 56 to the operator 32 and receive inputs from the operator. The operator input device 28 is contemplated as being a touchscreen which allows the operator to enter information directly through the display 56.

In the embodiment shown, a spacer block 58 is positioned between each of the meter bodies 38 to create the desired spacing between the meter bodies 38. The operator places a spacer block 58 adjacent to each meter body and uses the spacer blocks to push the meter along the meter conveyor 16.

Figure 5:
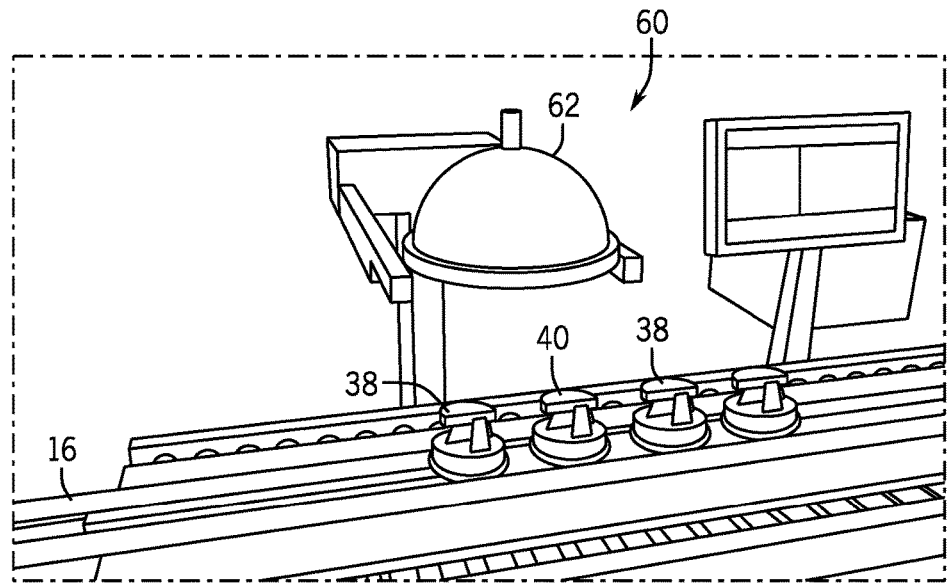
FIG. 5 is an illustration showing the position of the meter bodies below the imaging device.

After the individual meter bodies 38 have been positioned along the meter conveyor 16, the operator manually pushes one meter body at a time into the imaging station 60, which is best shown in FIG. 5. Before reaching the imaging station, each of the meter bodies 38 passes beneath a distance sensor 59, which is shown in FIG. 1. Since the system and method of the present disclosure can be used with meter bodies from a number of different meter manufacturers, the distance sensor 59 is used to determine the height of the meter body above the meter conveyor. The distance sensor 59 relays the height of the meter body to the control unit 12, which can use the height information to adjust the position of the imaging device 14. It is desired that the imaging device 14 is the same distance from each meter body when taking the digital image of the meter body.

Figure 8:
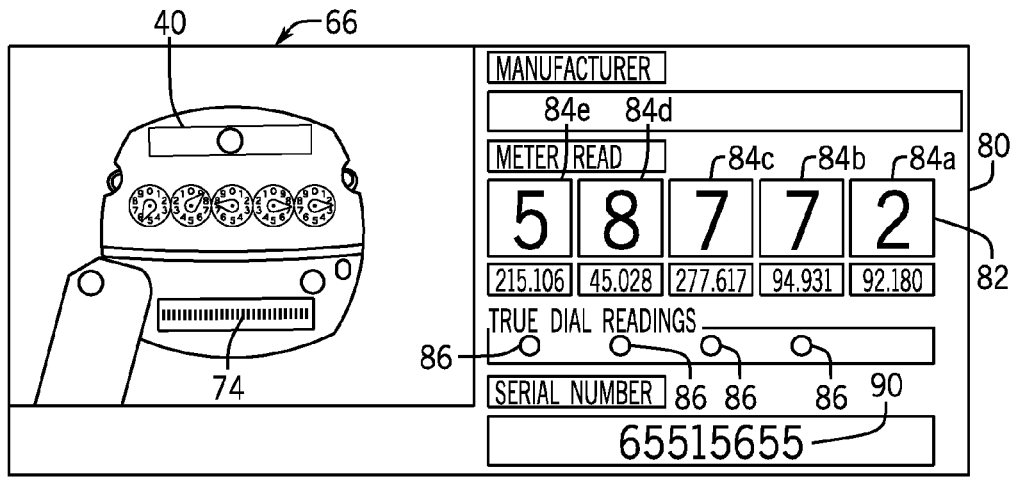
FIG. 8 is a first display screen illustrating the digital image of the meter face.

The imaging station 60 includes a dome 62 that surrounds an imaging device. The dome 62 functions as a cloudy day light source to reduce shadowing and provide as good of an image as possible of the meter face. The combination of the dome 62 and imaging device are adjustable based on the height of the meter body, as determined by the distance sensor 59. As was described in FIG. 1, the imaging device is preferably a digital camera that is positioned to face downward toward the meter conveyor 16 to obtain digital images of the meter face 40 of each meter body 38 as the meter bodies 38 is indexed along the length of the meter conveyor 16. As illustrated in step 64 in FIG. 2, once each of the meters is positioned below the imaging device, such as a digital camera, the height of the digital camera is adjusted and the digital camera operates to obtain a digital image of the meter face, as illustrated in step 64. The digital image 66 of the meter face is shown in FIG. 8. The digital image 66 provides a clear image of the meter face 40 for the meter body and is presented on the display 56 shown in FIG. 4. Since the meter cover was previously removed, the imaging device has a clear view of the meter face 40.

Figure 7:
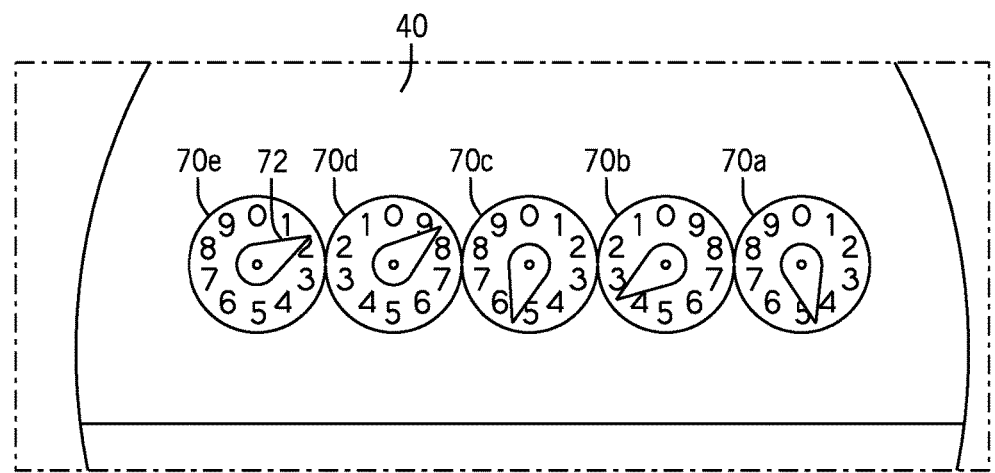
FIG. 7 is a view showing the meter dials contained on the meter face.

Referring now to FIG. 7, the meter face 40 includes a meter display that includes a series of individual meter dials 70a-70e that are read from the right (70a) to left (70e). The meter dial 70a on the right-side indicates the smallest number of the reading while the meter dial on the left (70e) indicates the largest number. When interpreting the individual meter dials shown in FIG. 7, when a pointer 72 is between two numbers, the reading should be the lower of the two numbers.

Presently, different methods and systems are available for automatically interpreting the values of each of the meter dials 70a-70e based upon the position of the pointer 72. The automated methods for determining the values for each of the individual meter dials is contained within the programming of the control unit 12 shown in FIG. 1. By utilizing the meter reading program contained in the control unit, the control unit is able to generate a five digit meter reading.

Figure 9:
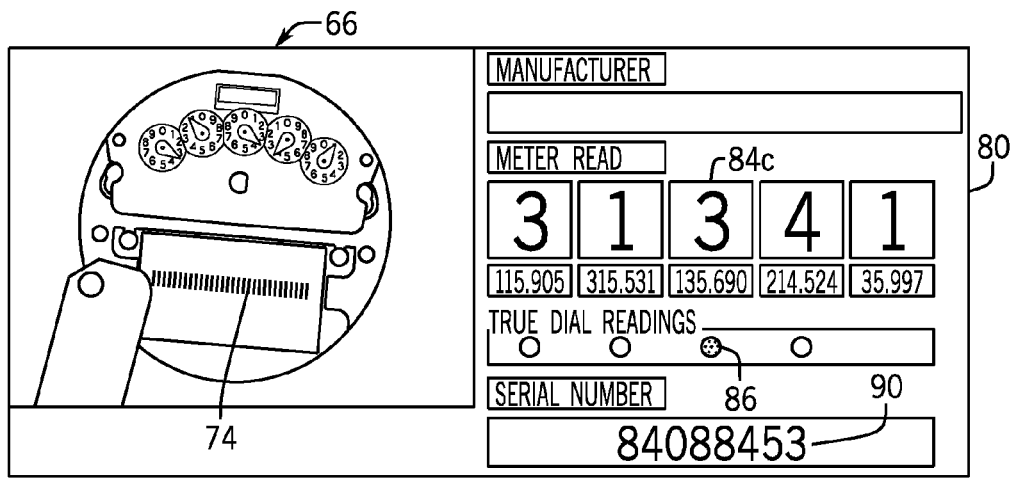
FIG. 9 is a second display screen showing the problem reading one of the meter dials.
Figure 10:
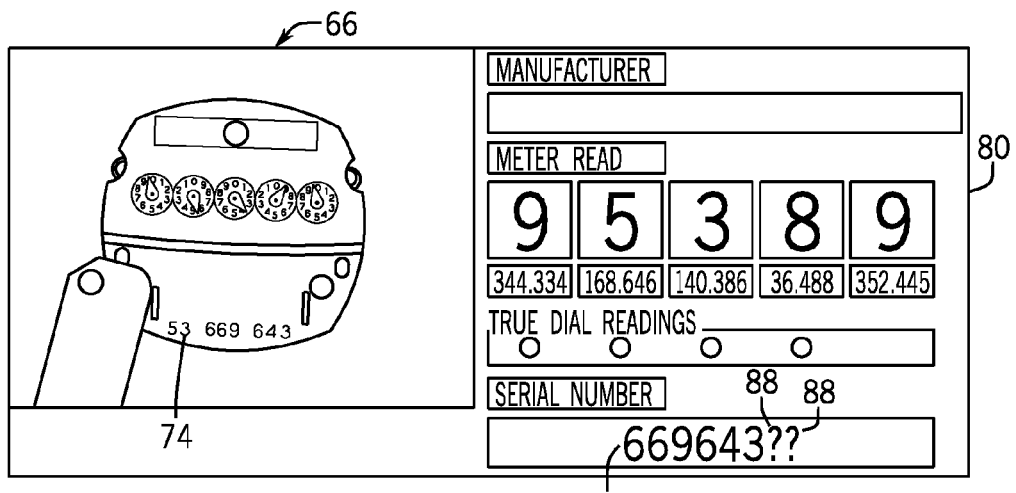
FIG. 10 is a display screen showing the failure to read the serial number from the meter body.

Referring back to FIG. 8, in addition to including the series of meter dials on the meter face 40, the digital image 66 also includes the serial number of the meter, which in the images shown in FIGS. 8 and 9 is represented by a barcode. In FIG. 10, the serial number is represented by an 8-digit series of numbers. Although the barcode shown in FIGS. 8 and 9 are easier to interpret, the series of numbers shown in FIG. 10 can be read using optical character recognition (OCR). The control unit 12 that forms part of the system of the present disclosure includes operating software programs that are able to either read the barcode serial number or series of numbers that represent the serial number, as shown in step 76 in FIG. 2.

Once the control unit has received the digital image and has carried out the processing in step 76, the control unit determines in step 78 whether or not the meter reading and serial number reading is complete.

In one example of the present disclosure, the programming on the control unit monitors the angle of each of the pointer 72 for the series of meter dials. Based on the angle of each pointer relative to the angle of the pointer on either side, the software operating on the control unit is able to determine if the calculated values for each of the meter dials is within a normal range. If one or more of the pointers 72 appear to be out of range based upon the determined angle of the pointer, the control unit generates an indication to the operator of such error or potential error.

In the display screen 80 shown in FIG. 8, the control unit displays a 5-digit meter reading 82 in which each of the individual numbers 84a-84e represents the value of the corresponding meter dial 70a-70e. Since the lowest number 84a represents the lowest meter dial 70a, the value of this number is far less critical that the value of the largest number 84e.

On the display screen 80 shown in FIG. 8, an indicator 86 is located beneath each of the individual meter numbers 84b-84e. The indicator 86 is used to present information to the operator as to whether the value represented by the individual number 84b-84e appears to be accurate. In one embodiment of the present disclosure, the color of the indicator 86 can change depending upon the accuracy of the reading. As an example, the indicator 86 could be red when the number is not accurate or could be green when the number is accurate. Other types of indicators, such as changing shapes, flashing indicators or other alternates are possible as long as the indicator provides information to the operator as to the potential inaccuracy of one of the digits of the meter reading.

Referring now to FIG. 9, the indicator 86 beneath the number 84c is red indicating that the number 84c may not be accurate. Since the display screen 80 is presented to the operator, the operator can manually change the value of the number 84c based upon a review of the digital image 66. In the embodiment shown, the number 84c is actually correct, however, the because the meter body was slightly askew, the control unit was unable to make a determination to a high enough degree of certainty and thus generates the indicator 86 to provide this information to the operator.

In the embodiment shown in FIG. 10, the display screen 80 presented to the operator includes a pair of empty digits 88 providing an indication to the operator that the serial number reading 90 may not be accurate. The empty digits provide a visual indication to the operator that the operator should review the digital image 66 to verify the accuracy of the serial number reading 90. Once again, the operator can adjust the serial number reading 90 depending upon the review of the digital image 60. Steps 92 and 94 illustrate the process of the operator either manually entering the serial number (step 92) or manually entering a meter reading (step 94).

If the control unit determines that either the final meter measurement or the serial number may have errors, the control unit activates the solenoid stopper 53 shown in FIG. 1. When activated, the solenoid stopper 53 extends a control rod and associated plate to prevent movement of the meter bodies along the length of the meter conveyor. In an embodiment that includes a drive motor 54, the control unit would disable operation of the drive motor to prevent another meter body from being positioned beneath the imaging device.

The control unit will then wait for the operator to correct the error in either the final meter reading or the serial number on the display screen. Once the errors have been corrected, the control unit allows the next meter body to move beneath the imaging device.

Once the digital image and readings shown in FIGS. 8-10 have been made, the control unit of the present disclosure stores the digital image 66, the meter reading 82 and the serial number reading 90 in an historical database contained on the memory device 20. The historical database thus correlates the stored image taken by the digital camera with the meter reading 82 and serial number reading 90 made utilizing the operating systems contained on the control unit 12. In step 96, this information is stored in a historic database.

Since the meter is being recycled and eventually destroyed, the process of storing the actual digital image along with the meter reading 82 and the serial number reading 90 allows a utility, and operator or any other interested party the ability to review the meter face prior to its recycling. This process will allow a utility to confirm the final reading to an operator should any questions arise.

Figure 6:
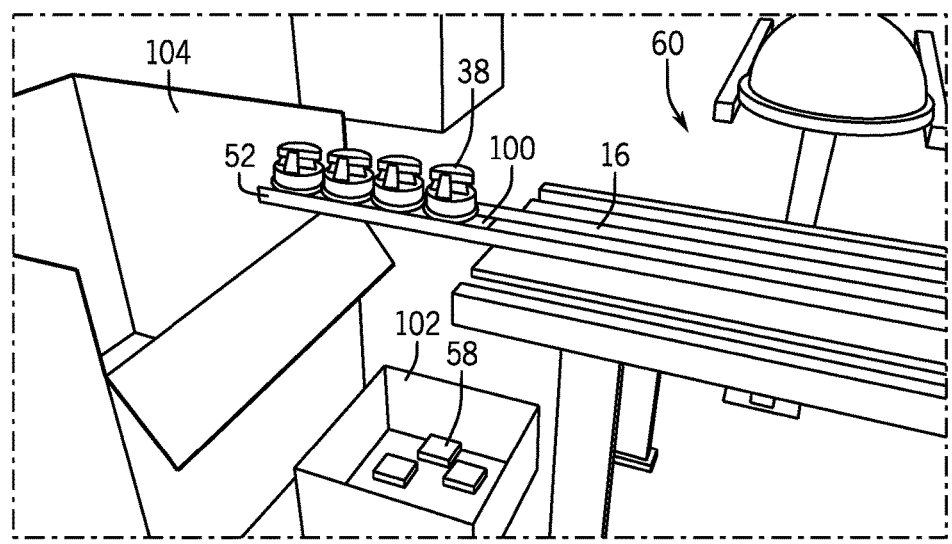
FIG. 6 is an illustration showing the meter bodies reaching the end of the processing steps.

Once the meter reading 82 and serial number reading 90 have been verified by the operator through the operator input device 28 shown in FIGS. 1 and 4, the meter is ready for final disposal. As shown in FIG. 6, each of the spacer blocks 58 falls through an opening 100 near the second end 52 of the meter conveyor 16 and is received within a collection box 102. The meter bodies 38 continue to proceed until they fall off of the second end 52 and into a collection box 104. Once the collection box 104 is filled, the collection box can be removed for further recycling. As illustrated in FIG. 2, the meter bodies are recycled either at the recycling facility or at a separate facility.

Although the method and system of the present disclosure contemplates that the image processing will take place within the recycling facility 10, it should be understood that the processing could take place at any other location. In such an embodiment, the digital images from the imaging device 14 could be relayed to an offsite facility through the wireless network 22. At this offsite facility, a control unit or other type of processing system could be utilized to process the image data and return the same display screens 80 for presentation to the operator 32. Since the operator 32 is located at the facility, it is important that the operator 32 ensures that all of the readings are entered before the meter is placed into the collection bin 104.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

I claim:

1. A method of recycling a plurality of utility meters at the end of life of each utility meter, wherein each of the utility meters includes a meter cover and a meter body having a meter face including a plurality of meter dials and a serial number, the method comprising the steps of:
   removing the meter cover from the meter body prior to obtaining the digital image;
   positioning each of the utility meters beneath a digital imaging device;
   obtaining a digital image of the meter face with the meter cover removed;
   transferring the digital image to a control unit;
   processing the digital image of the meter face in the control unit to obtain the serial number of the meter and a final meter reading from the plurality of meter dials;
   determining in the control unit whether the final meter reading includes an acceptable reading for each of the plurality of meter dials;
   generating a missing reading indicator when the final meter reading does not include an acceptable reading for all of the plurality of meter dials;
   storing the digital image, serial number and final meter reading for each of the plurality of utility meters; and
   recycling each of the utility meters.

2. The method of claim 1 further comprising the steps of:
   placing the plurality of utility meters on a conveyor;
   operating the conveyor to move each of the plurality of utility meters beneath a camera; and
   operating the camera to obtain the digital image.

3. The method of claim 2 further comprising the steps of:
   determining the height of each of the plurality of utility meters when the utility meters are on the conveyor; and
   adjusting the position of the camera based on the determined height.

4. The method of claim 1, further comprising the step of:
manually entering a reading for each of the plurality of meter dials that is not acceptable to complete the final meter reading.

5. The method of claim 1 wherein the control unit generates a missing serial number indicator when the serial number is not complete.

6. The method of claim 1 further comprising the digital image, final meter reading and serial number for each of the plurality of utility meters is stored in a database, further comprising the step of providing access to the database to verify the stored serial number and the stored final meter reading.

7. The method of claim 2 further comprising the step of placing a spacer between each of the plurality of meters on the conveyor.

8. A system recycling a plurality of utility meters at the end of life of each utility meters, wherein each of the utility meters includes a meter cover and a meter body having a meter face including a plurality of meter dials and a serial number, the system comprising:
a control unit;
a meter conveyor that receives each of the utility meters and is operable to move the utility meters from a first end to a second end of the meter conveyor;
a digital imaging device positioned above the meter conveyor between the first and second ends of the meter conveyor and operable to obtain a digital image of the meter face of one of the utility meters when the utility meter is positioned below the digital imaging device; and
an operator interface device including at least an operator interface and a display,
wherein the control unit receives that digital image and determines the serial number and a final meter reading for each of the utility meters from the digital image, wherein the final meter reading includes a number of meter dial readings and the control unit determines whether the final meter reading includes an acceptable meter dial reading for each of the plurality of meter dials and visually indicates any unacceptable meter dial reading.

9. The system of claim 8 wherein the digital image, the serial number and the final meter reading are shown on the display.

10. The system of claim 8 wherein the control unit operates the meter conveyor.

11. The system of claim 8 further comprising a memory device in communication with the control unit, wherein the digital image, serial number and final meter reading are stored in the memory device.

12. The system of claim 8 wherein the digital imagining imaging device is a camera.

13. A method of recycling a plurality of utility meters at the end of life of each utility meter, wherein each of the utility meters includes a meter cover and a meter body having a meter face including a plurality of meter dials and a serial number, the method comprising the steps of:
removing the meter cover from each of the utility meters;
placing each of the plurality of meters on a conveyor;
operating the conveyor to move each of the utility meters beneath a digital imaging device;
obtaining a digital image of the meter face when the utility meter with the cover removed is beneath the digital imaging device;
transferring the digital image to a control unit;
processing the digital image of the meter face in the control unit to obtain the serial number of the meter and a final meter reading from the plurality of meter dials;
determining whether the final meter reading includes an acceptable reading for each of the plurality of meter dials;
manually entering a reading for each of the plurality of meter dials that is not acceptable to complete the final meter reading;
visually presenting the digital image, serial number and final meter reading;
storing the digital image, serial number and final meter reading in a historical database; and
recycling the utility meter.

14. The method of claim 13 wherein the control unit generates a missing reading indicator when the final meter reading does not include an acceptable reading for all of the plurality of meter dials.

15. The method of claim 13 wherein the control unit generates a missing serial number indicator when the serial number is not complete.

16. The method of claim 13 further comprising the step of providing access to the historical database to verify the stored serial number and the stored final meter reading.

* * * * *

UNITED STATES PATENT AND TRADEMARK OFFICE
CERTIFICATE OF CORRECTION

| | | |
|---|---|---|
| PATENT NO. | : 10,102,617 B2 | Page 1 of 1 |
| APPLICATION NO. | : 15/191671 | |
| DATED | : October 16, 2018 | |
| INVENTOR(S) | : Gregory J. Gozdowiak | |

It is certified that error appears in the above-identified patent and that said Letters Patent is hereby corrected as shown below:

In the Claims

Column 10, Line 7, Claim 12 delete "imagining" and insert --imaging--.

Signed and Sealed this
Twenty-fourth Day of September, 2019

Andrei Iancu
*Director of the United States Patent and Trademark Office*